No. 827,069.
PATENTED JULY 24, 1906.
D. D. LONG.
FENCE SUPPORT.
APPLICATION FILED NOV. 2, 1905.
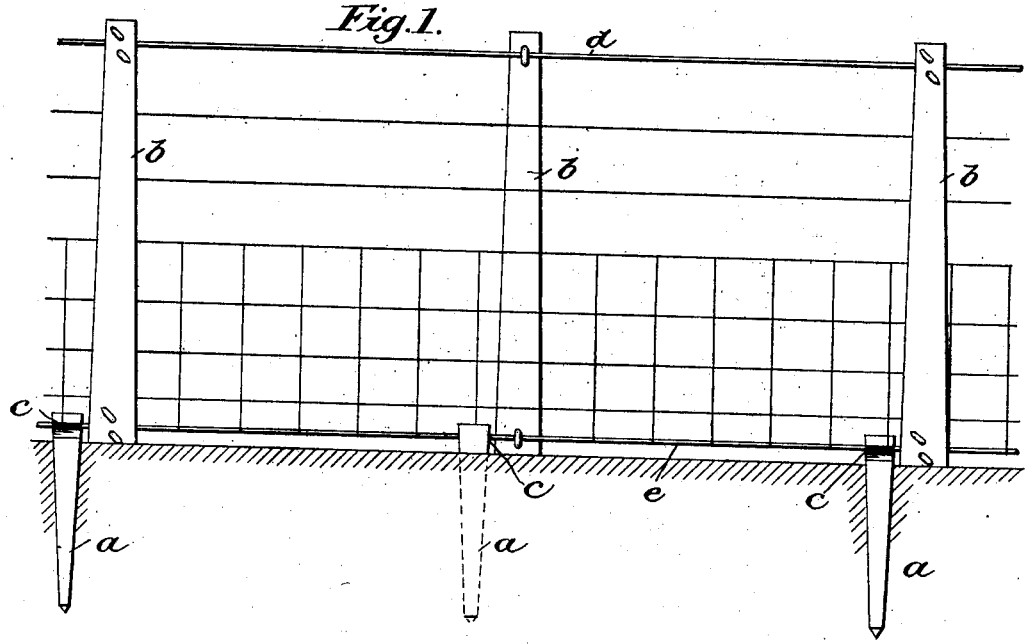
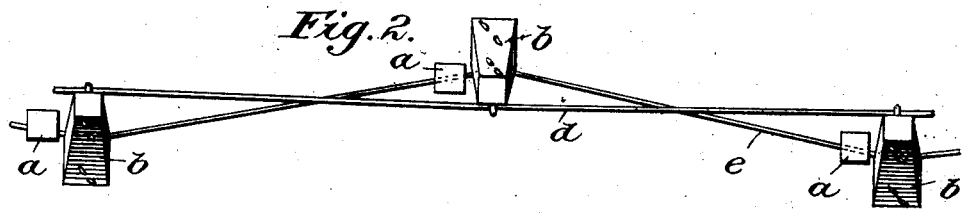
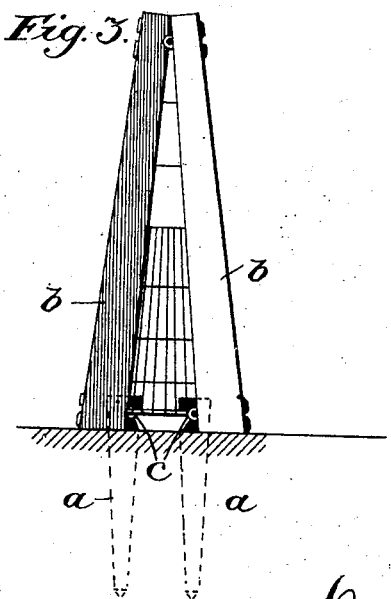
Witnesses:
J. Frank Jones
Tom Presley.
Inventor:
David Dillon Long

UNITED STATES PATENT OFFICE.

DAVID DILLON LONG, OF CONWAY, ARKANSAS.

FENCE-SUPPORT.

No. 827,069.  Specification of Letters Patent.  Patented July 24, 1906.

Application filed November 2, 1905. Serial No. 285,619.

*To all whom it may concern:*

Be it known that I, DAVID DILLON LONG, a citizen of the United States, residing at Conway, in the county of Faulkner and State of Arkansas, have invented a new and useful Fence-Support, of which the following is a specification.

My invention relates to improvements in fence-supports, in which a vertical pin driven in the ground and an inclined rib above the ground in separate parts operate in conjunction with a zigzag base of fence and straight top of fence.

The objects of my invention are, first, to fasten the base of the fence securely to the ground by means of the vertical pins; second, to hold the fence in an upright position by means of the ribs in conjunction with the tension afforded by the vertical pins; third, to render the fence stable by so arranging the ribs that alternate ribs inclined in opposite directions, acting, in conjunction with the pins and base-wire of the fence, act as braces to each other, thus making a stable fence-support; fourth, a sectional fence-support in two parts, a pin $a$ and a rib $b$, in conjunction with a zigzag base-wire $e$ and a straight top wire $d$, all acting together forming a substantial fence-support. I attain these objects by the mechanism illustrated in the accompanying drawings, in which—

Figure 1 represents a vertical section of the fence. Fig. 2 represents a top view of the fence, and Fig. 3 represents an end view of the fence.

Similar letters refer to similar parts in each figure.

In each figure, $a$ is a pin having a notch $c$ near the top and sunk in the ground, in which the base-wire $e$ is fastened.

$b$ is an inclined rib to which all the wires of the fence are fastened.

To construct this fence, I set up the first rib on the ground and secure the same with guy-wires. I then stretch the wires forming the fence in a straight line along where the fence is to be erected. I then set pins $a$ in the ground about eight inches to the right and left alternately of the straight base-line with the notch $c$ turned from the base-line. I then spring the base-wire $e$ over the top of pin $a$ and into the notch $c$, forming a zigzag base. I then set rib $b$ on the ground near pin $a$ and staple bottom wire $e$ to lower end of rib $b$. Then staple all wires above, including straight top wire $d$ to rib $b$ at its top, inclining ribs $b$ alternately in opposite directions, thus forming a zigzag base and straight top wherein alternate ribs brace each other and firmly hold the fence in an upright position, and the pins $c$ hold the fence firmly to the ground and prevent it from falling to either side.

The advantages of the sectional fence-support are that a pin $a$ when decayed can be replaced by a new one without injury to the fence and at very small cost or trouble; that the rib $b$ when decayed or broken can be replaced without injury to the fence and at a very nominal cost and trouble; that if the pin $a$ should be raised or thrown up by frost or freezes it may be driven back in a moment and without injury to or affecting the fence; that should the base-wire $e$ become slack from expansion and contraction on account of heat of summer or cold of winter or from any other cause it may be easily tightened again by resetting the pins $a$ $a$ a little farther from the straight base-line and springing the base-wire $e$ over the top of the pin and into the notch $c$ again, as before described, and in so doing no injury is done to the fence. The fence may be removed from one place to another and set up again with but little labor and no injury to the fence. To do so, draw pins $a$ and lay the fence flat on the ground without removing ribs $b$. Begin at one end and roll the wire and ribs into a roll, haul to the place where it is desired to set up the fence, unroll it, and set up as before described. Moreover, it takes much less material and labor to make and place in the fence pins $a$ and ribs $b$ than it does to make and place in the fence posts or any other fence-support, thus lessening or decreasing the cost of the fence.

I am aware that prior to my invention several forms of wire and wire fences have been made. I therefore do not claim such a combination broadly; but

I claim—

The combination in a fence-support, of vertical pins, inclined ribs, a zigzag base-wire and a straight top wire, all substantially as set forth.

DAVID DILLON LONG.

Witnesses:
 R. V. BRAZIL,
 ARTHUR SEVIER.